US006969186B2

(12) United States Patent
Sonderegger et al.

(10) Patent No.: US 6,969,186 B2
(45) Date of Patent: Nov. 29, 2005

(54) DEVICE FOR CONDUCTING SOURCE LIGHT THROUGH AN ELECTROMAGNETIC COMPLIANT FACEPLATE

(75) Inventors: Mark Sonderegger, Kanata (CA); Balwantrai Mistry, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 128 days.

(21) Appl. No.: 10/681,595

(22) Filed: Oct. 8, 2003

(65) Prior Publication Data

US 2005/0078489 A1   Apr. 14, 2005

(51) Int. Cl.⁷ ................................................ F21V 7/04
(52) U.S. Cl. .................... 362/551; 362/489; 362/555; 362/581
(58) Field of Search .............................. 362/551, 554, 362/555, 556, 581, 489

(56) References Cited

U.S. PATENT DOCUMENTS 5,938,324 A * 8/1999 Salmon et al. ............... 362/555
6,099,152 A * 8/2000 Naganawa et al. ......... 362/489

* cited by examiner

Primary Examiner—Y. My Quach-Lee
Assistant Examiner—Mark Tsidulko
(74) Attorney, Agent, or Firm—Guerin & Rodriguez, LLP; William G. Guerin

(57) ABSTRACT

A device for conducting light through an electromagnetic compliant faceplate is described. The device includes a first light pipe, a second light pipe, and a connector. The first light pipe has a first end to receive light from a first light source and a second end with an expanded endface. The second light pipe has a first end to receive light from a second light source and a second end with an expanded endface. The connector is attached to the first and second light pipes and has an elongated portion, a first attachment portion and a second attachment portion. The first and second attachment portions extend from the elongated portion and are coupled to the first and second light pipes.

12 Claims, 5 Drawing Sheets

DEVICE FOR CONDUCTING SOURCE LIGHT THROUGH AN ELECTROMAGNETIC COMPLIANT FACEPLATE

FIELD OF THE INVENTION

The invention relates generally to electromagnetic compliant enclosures. More particularly, the invention relates to light pipe devices for conducting light through electromagnetic compliant faceplates.

BACKGROUND

Light emitting diodes (LEDs) are often used to indicate the operational status of circuitry. LEDs are generally small and often mounted on circuit boards or electronic modules within an electromagnetic compliant (EMC) enclosure. In some applications, an EMC faceplate shields the LEDs from sight. However, EMC faceplates can have bores, or openings, that have diameters less than predetermined values without affecting the EMC properties of the enclosure.

Light pipes are sometimes used to transfer the light emitted by the LEDS to a viewable surface that is external to the EMC enclosure. The light pipes pass through the bores of the faceplate. As such, the diameter of the light pipe is constrained by the predetermined maximum bore diameter that does not degrade the EMC properties. This diameter can be a few millimeters or less, depending on the specific EMC requirements and the enclosed circuitry. As such, the viewing surface outside the enclosure typically does not exceed a few millimeters and is therefore difficult to see. Often light from one light pipe couples, or "bleeds", into one or more neighboring light pipes through the structure used to fix the light pipes to each other. Thus, if only one LED is on, neighboring light pipes can also receive some of the light emitted from the active LED at their respective endfaces, thereby making it difficult to determine the status of the circuitry. Additionally, if the LEDs generate different color light, the light from LEDs of neighboring light pipes can reduce the visibility at the endface of a given light pipe.

What is needed is a device for conducting light through an electromagnetic compliant faceplate that is not limited in size by EMC requirements and reduces the bleeding of light into neighboring light pipes. The present invention satisfies this need and provides additional advantages.

SUMMARY OF THE INVENTION

In one aspect, the invention is directed to a device for conducting light through an electromagnetic compliant faceplate. The device includes a first light pipe, a second light pipe and a connector. The first and second light pipes each has a first end to receive light from a respective light source and a second end with an expanded endface. The connector has an elongated portion, a first attachment portion and a second attachment portion. The first and second attachment portions extend from the elongated portion and are coupled to the first and second light pipes, respectively. In one embodiment, the first and second light pipes and the connector are fabricated as an integral unit. In another embodiment, the first and second light pipes are fabricated from a clear plastic material. In yet another embodiment, the first and second attachment portions attach to the first and second light pipes at a first point and a second point, respectively. The elongated portion is substantially parallel to a line defined between the first and second points.

In another aspect, the device includes a first light pipe, a second light pipe, and a connector. The first and second light pipes each has a first end to receive light from a respective light source and a second end with an expanded endface. The connector is attached to the first and second light pipes. The connector has at least one tab, an elongated portion, a first attachment portion and a second attachment portion. The first and second attachment portions extend from the elongated portion and are coupled to the first and second light pipes, respectively. In one embodiment, each of the first and second light pipes extend through a respective opening in the faceplate. In another embodiment, the device also includes the light sources. In a further embodiment, the light sources are light emitting diodes. In yet another embodiment, the tab or tabs of the connector include a resilient stem having a first end attached to the connector and a second end to be received by a channel in the electromagnetic compliant faceplate.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1A:
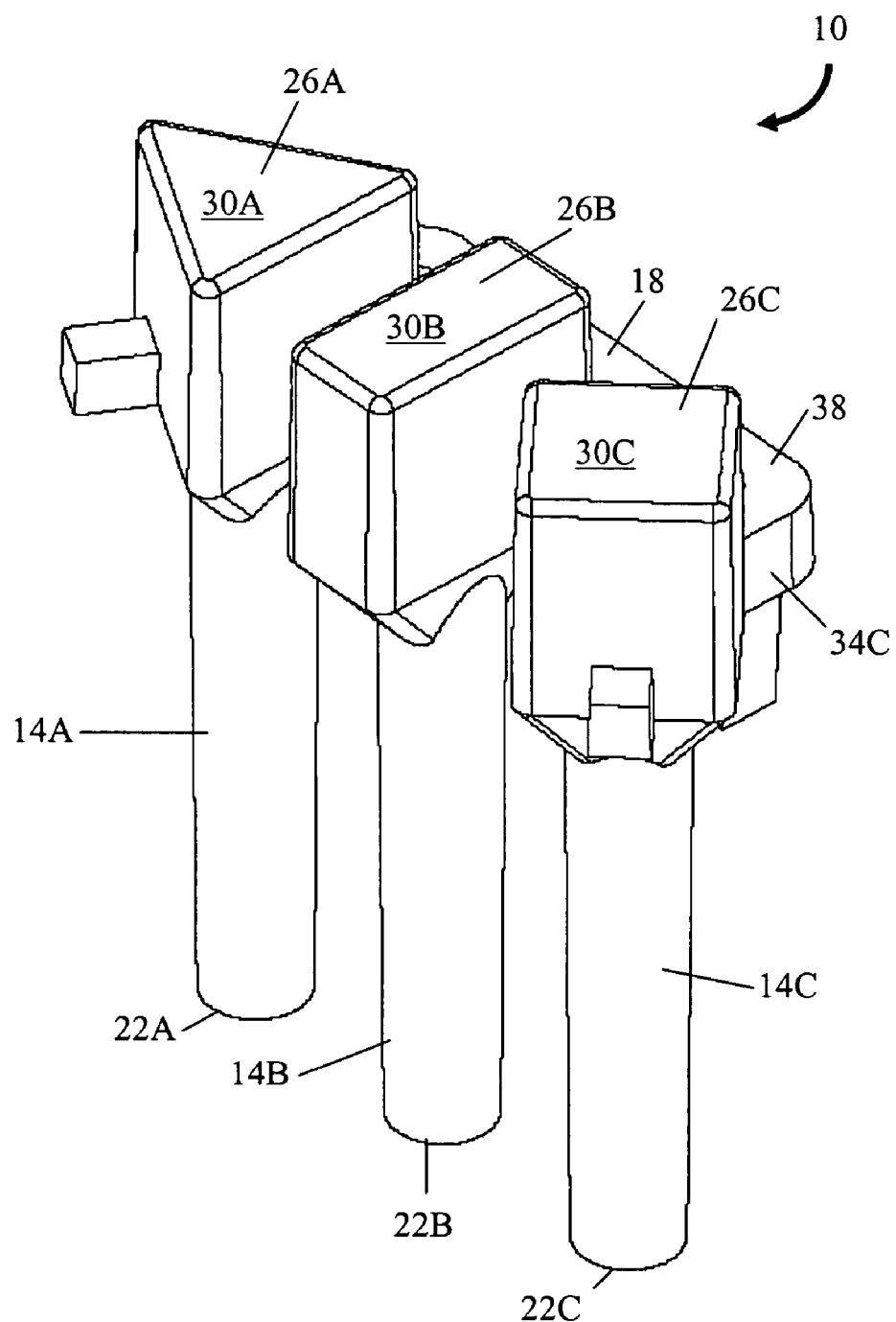
FIGS. 1A and 1B are isometric views of a device for conducting light through an electromagnetic compliant faceplate according to an embodiment of the present invention.
Figure 1B:
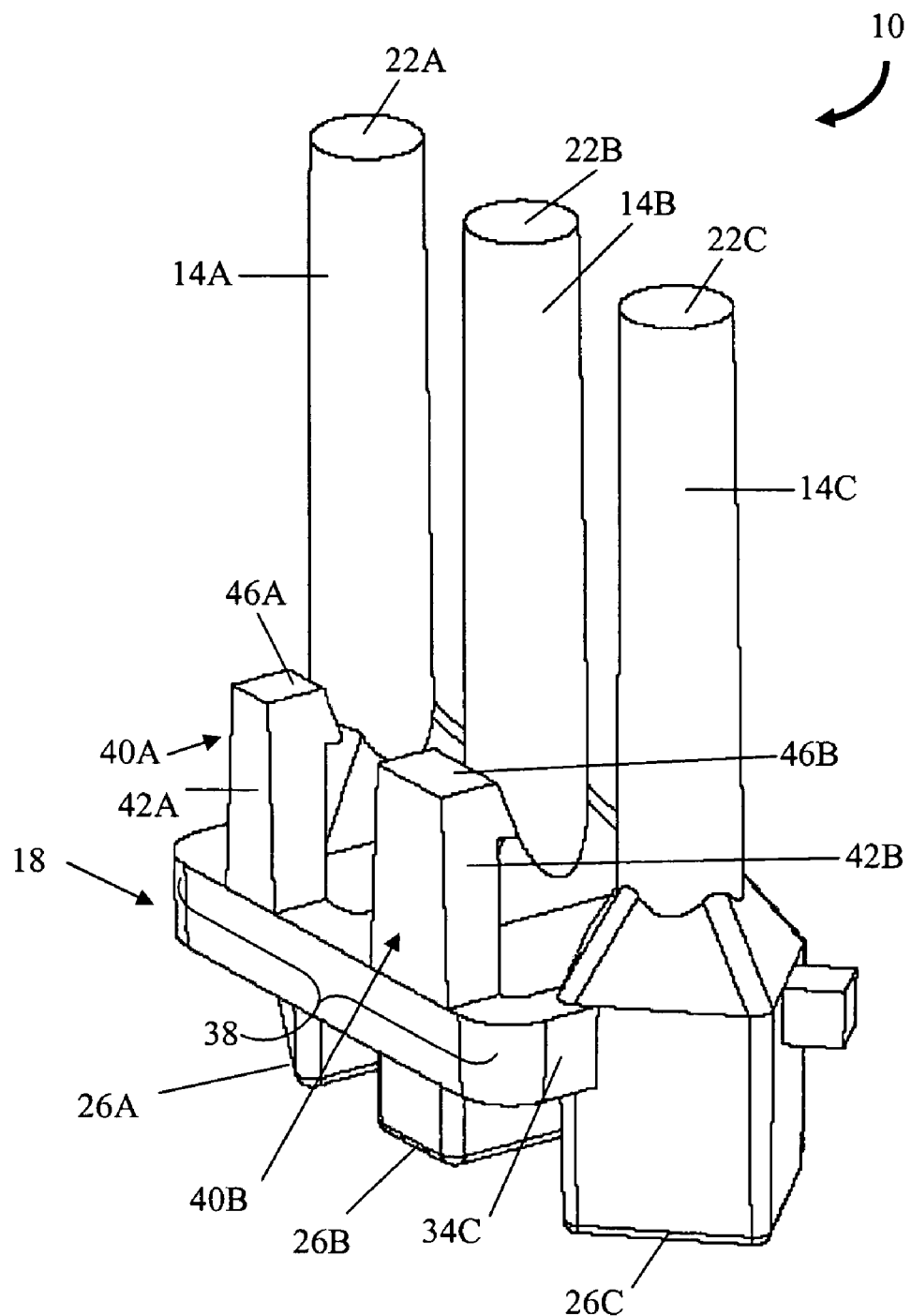
Figure 1C:
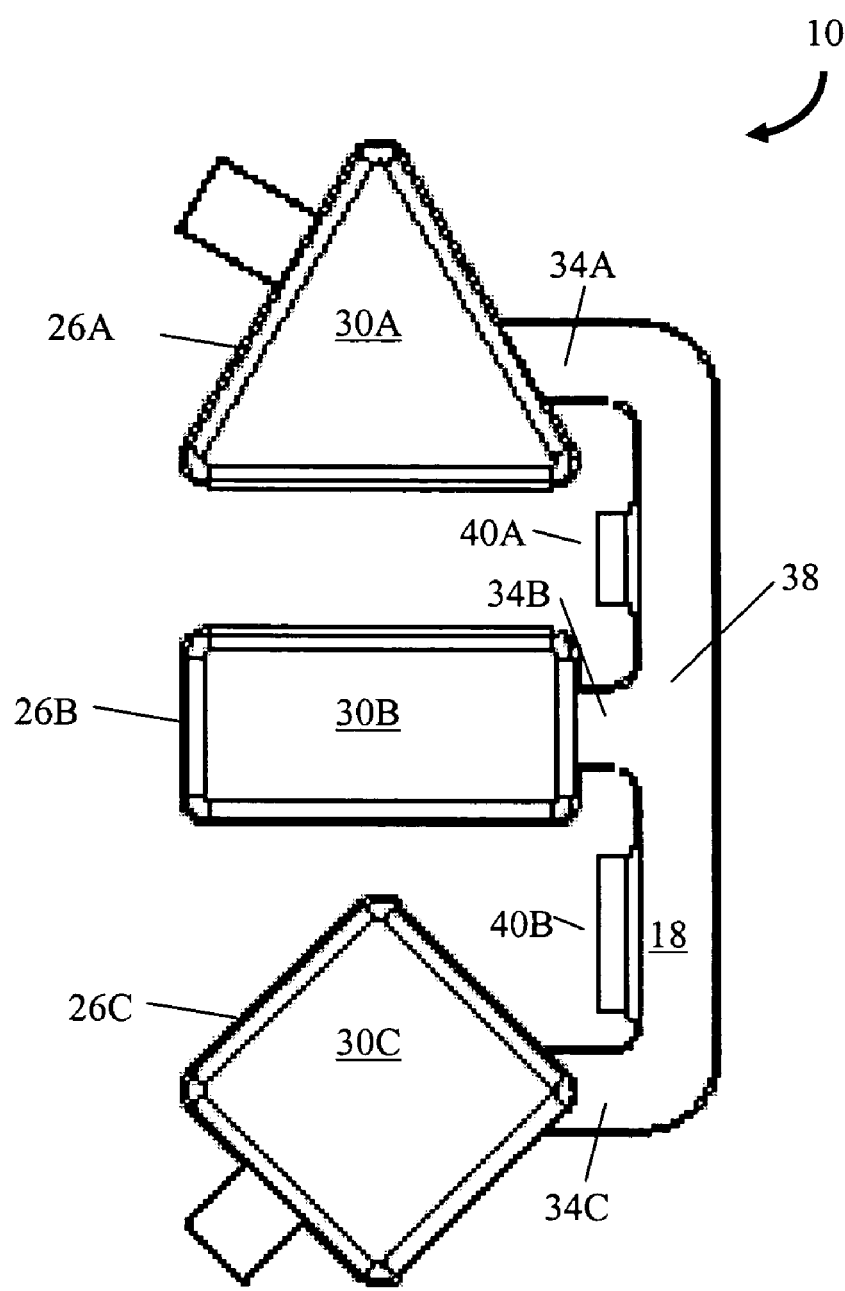
FIG. 1C is an end view of the device of FIGS. 1A and 1B.

With reference to FIGS. 1A, 1B, and 1C, in one embodiment the invention is directed to a device 10 for conducting light through an electromagnetic compliant (EMC) faceplate. The device includes a first light pipe 14A, a second light pipe 14B, and a third light pipe 14C (referred to generally as light pipes 14) attached to a connector 18. The light pipes 14 each have a first end 22A, 22B, 22C (referred to generally as first ends 22) and a second end 26A, 26B, 26C (referred to generally as second ends 26). Each of the second ends 26 has an expanded endface 30A, 30B, 30C, respectively (referred to generally as endface 30). The light pipes 14 have circular cross-sections with cross-sectional areas less than the areas of their respective expanded endfaces 30. The light pipes 14 are adapted to conduct (i.e., transmit within the light pipe) light incident on their first ends 22 from respective light sources. The light sources can be, for example, light emitting diodes (LEDs) or laser diodes.

The diameter of the first ends 22 is approximately the same as the diameter of the respective light pipes 14. The expanded endfaces 30 of the second ends 26 have a shape (e.g., polygonal) and are substantially larger than the diameter of the light pipes 14 to facilitate viewing. In some applications each endface 30 has a particular shape that is associated with one of the different modes or possible status conditions of the enclosed circuitry. For example, the endface 30A of one light pipe 14 is triangular, the endface 30B of the second light pipe 14 is rectangular, and the endface 30C of the third light pipe 14 is square.

The connector 18 includes attachment portions 34A, 34B, and 34C (referred to generally as attachment portions 34, only 34C is visible due to perspective views) and an elongated portion 38. The attachment portions 34 extend from near the second ends 26 of the light pipes 14 at respective attachment points. The elongated portion 38 attaches to each of the respective attachment portions 34, such that the elongated portion 38 is substantially parallel to a line defined by the attachment points of the attachments portions 34.

The connector 18 maintains the alignment of the light pipes 14 with respect to each other and to respective openings for the light pipes 14 in the EMC faceplate. For example, the light pipes 14 can be in substantially planar alignment. In the illustrated embodiment, the light pipes 14 are also parallel to each other. The attachment portions 34 extend from the light pipes 14 in a direction substantially orthogonal to the axes of the light pipes 14. The elongated portion 38 lies in a plane that is substantially parallel to the plane of the light pipes 14 and extends in a direction substantially orthogonal to the axes of the light pipes 14 and substantially orthogonal to the attachment portions 34. Because the connector 18 is "out-of-plane" with the light pipes 14, there is no direct optical path established between the light pipes 14 by the connector 18. Thus the bleeding of light from one light pipe 14 into another light pipe 14 is substantially reduced over conventional light pipe devices having direct coupling of the light pipes.

In the illustrated embodiment, the connector 18 includes tabs 40A, 40B (referred to generally as tabs 40). The tabs 40 include resilient stem portions 42A, 42B attached at one end to the elongated portion 38 of the connector 18. Each tab includes a second end 46A, 46B shaped to be received in a channel in the faceplate. For example, the second ends 46 can be barb-shaped, although other shapes are possible.

Figure 2:
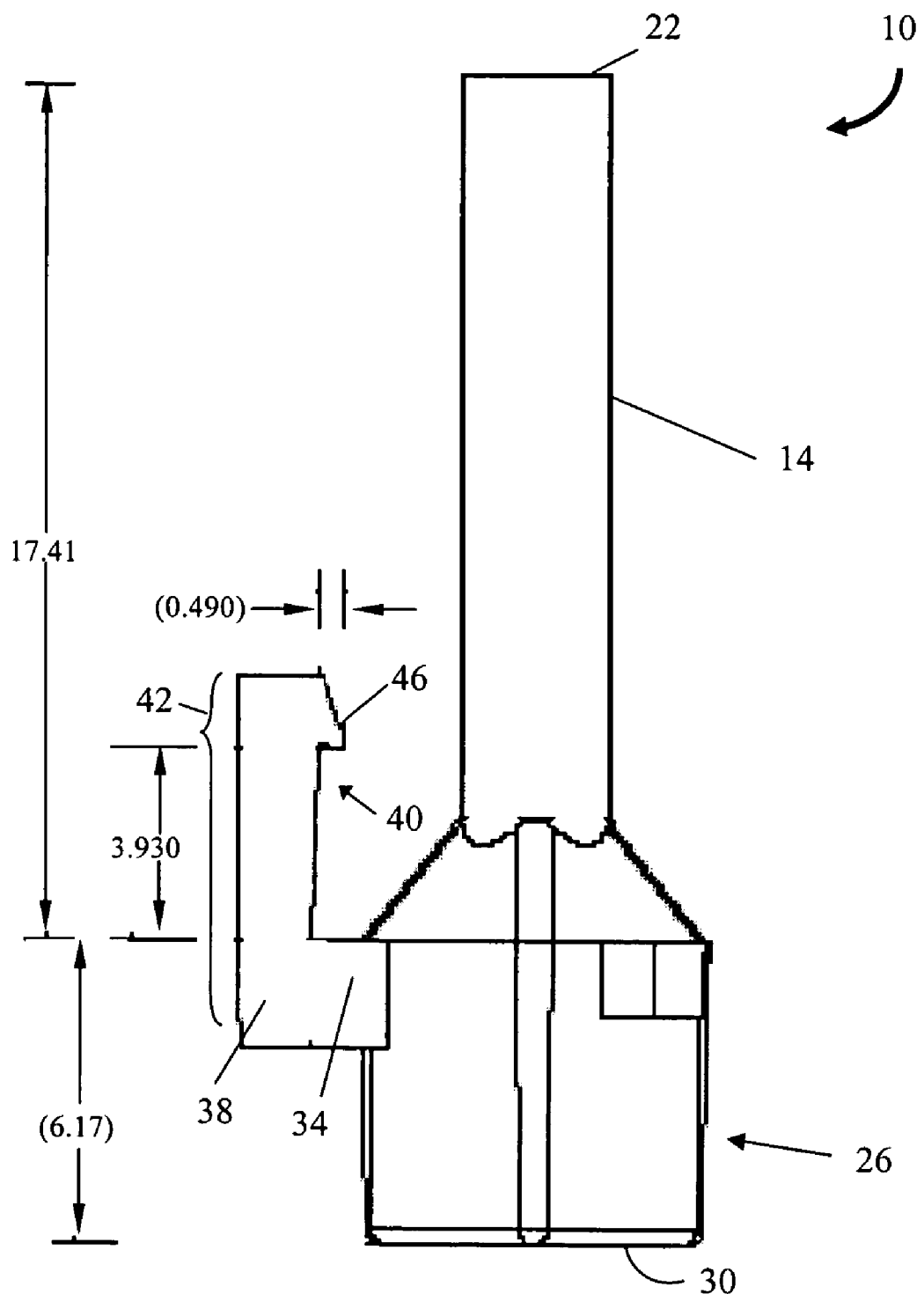
FIG. 2 is a side view of the device of FIGS. 1A and 1B showing exemplary dimensions.

In the illustrated embodiment, the device 10 is constructed as an integral unit and has exemplary dimensions as shown in FIG. 2. For example the device 10 is constructed using an injection molding technique, although other techniques can be used as well such as machining from a block of material. The device 10 is constructed out of a clear plastic material such as optically clear polycarbonate although other materials such as glass are possible. As stated above, the device is designed to conduct light from a light source to a viewable expanded endface 30, therefore any material that can transmit light from the light source to the endface 30 can be used.

Figure 3:
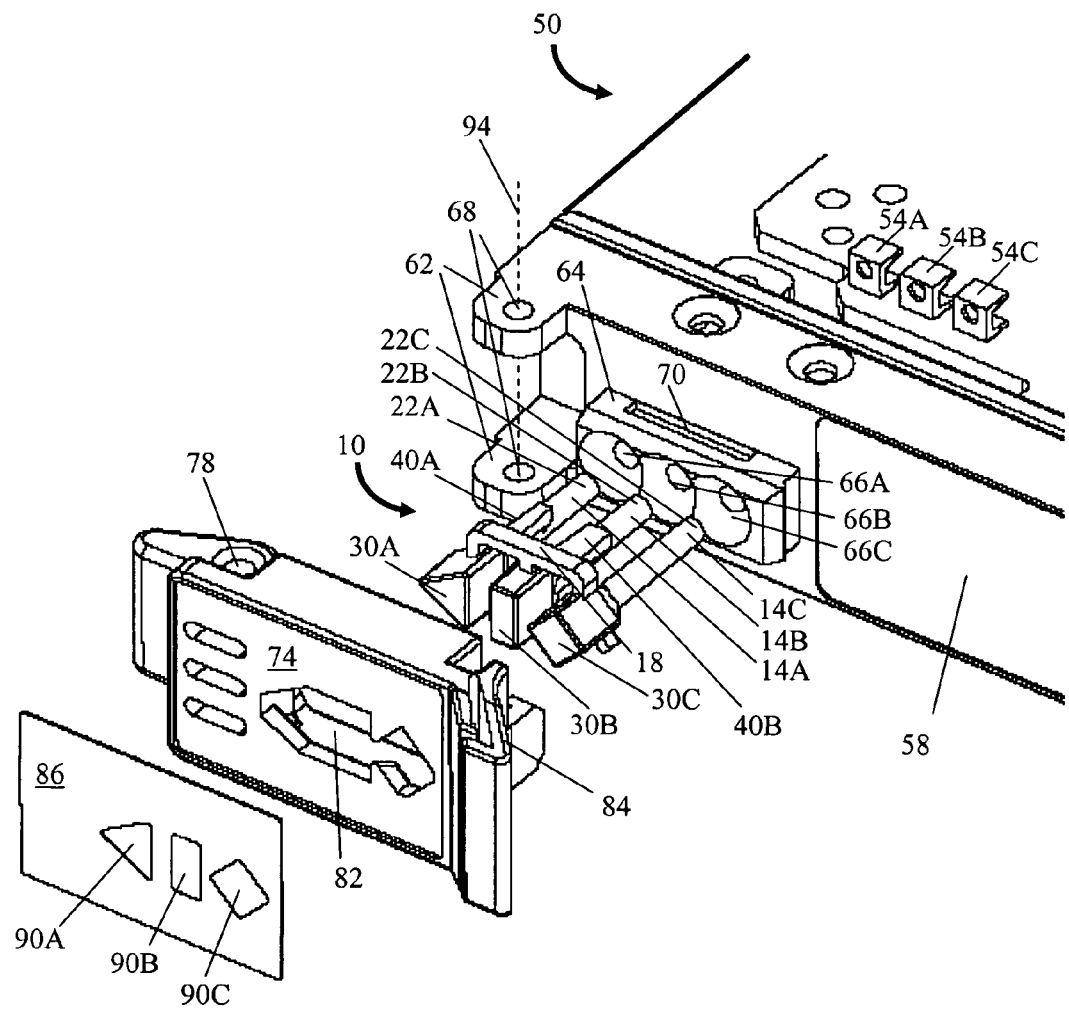
FIG. 3 is an exploded view of the device of FIGS. 1A and 1B mounted to an electromagnetic compliant faceplate.

With reference to FIG. 3, the device 10 is used to indicate the status of circuitry contained within an EMC enclosure 50. The enclosure 50 contains a first light source 54A, a second light source 54B, and a third light source 54C (referred to generally as light sources 54). The light sources 54 are LEDs, although other light sources are possible. In one embodiment, each LED is a different color and is used to indicate a different operational status of the circuitry. For example, the first light source 54A is a red LED and used to indicate that the circuitry is not functioning properly, the second light source 54B is a green LED and used to indicate that the circuitry is functioning normally, and the third light source 54C is a blue LED and used to indicate that the circuitry is performing a specified operation (e.g., transmitting data).

The enclosure 50 includes an EMC complaint faceplate 58 and pivot tabs 62. The faceplate 58 is attached to or is otherwise integrated with the enclosure 50. The faceplate 58 includes a mounting frame 64, a first bore 66A, a second bore 66B, a third bore 66C (referred to generally as bores 66), and a channel 70 for receiving the barbed-shaped ends 46 of the device tabs 40. In one embodiment, the bores 66 have a diameter of 3 millimeters and length of 12 millimeters. In other words, the faceplate 58 has a 12 mm thickness and the bores 66 have an aspect ratio of 4:1. In other embodiments, other aspect ratios are used to satisfy EMC requirements of various designs.

The pivot tabs 62 include holes 68 to receive a pin that attaches a latch panel 74 to the enclosure 50. The latch panel 74 includes a bore 78 to receive the pin, an opening 82 shaped to pass the expanded endfaces 30 of the device 10, and a latch 84 to secure the latch panel to the faceplate 58. A label 86 having textured translucent portions is attached to the latch panel 74 to identify the circuit status corresponding to each endface 30. The label 86 includes a first opening 90A, a second opening 90B, and a third opening 90C (referred to generally as openings 90) to accommodate the respective endfaces 30 of the device 10.

The device 10 is installed to the faceplate 58 by inserting the light pipes 14 through the respective bores 66 of the faceplate 58. The channel 70 receives the barb-shaped ends 46 of the tabs 40 to secure the device 10 to the mounting frame 64 so that the first ends 22 of the light pipes 14 are maintained close to their respective light sources 54. The latch panel 74 rotates about an axis 94 defined by the holes 68 in the pivot tabs 62 and engages the faceplate 58 so that each endface 30 extends through the opening 82 in the latch panel 74 and a respective opening 90 in the label 86.

During operation of the enclosed circuitry, light from a light source 54 is conducted to the respective endface 30 of the device 10. For example, the enclosure 50 can include sources of different color light, such as green, red and blue. In this example, if the circuitry is operating correctly, the second light source 54B emits green light. The second light pipe 14B conducts the green light to its endface 30B. Because the connector 18 is out of plane with respect to the light pipes 14, any green light exiting the light pipe 14B through the attachment portion 34B encounters multiple bends in the light path before reaching any of the other light pipes 14A, 14C. Consequently, the green light intensity at the endfaces 30A, 30C of the neighboring light pipes 14A, 14C is substantially reduced in comparison to a conventional light pipe device having a direct connection between its light pipes.

While the invention has been shown and described with reference to specific preferred embodiments, it should be understood by those skilled in the art that various changes in form and detail may be made therein without departing from the spirit and scope of the invention as defined by the following claims. For example, the device 10 can include a connector 18 with an elongated portion 38 that is curved and can be non-planar. In another example, the attachment portions 34 of the connector 18 are not orthogonal to the axes of the light pipes 14 or the elongated portion 38. Instead, the attachment portions 34 include curves, or bends, where they join the light pipes 14 and/or the elongated portion 38, thereby providing an indirect light path between the light pipes 14.

What is claimed is:

1. A device for conducting light through an electromagnetic compliant faceplate comprising:

a first light pipe having a first end to receive light from a first light source and a second end with an expanded endface;

a second light pipe having a first end to receive light from a second light source and a second end with an expanded endface; and a connector having an elongated portion, a first attachment portion and a second attachment portion, the first and second attachment portions extending substantially orthogonal from the elongated portion, the first attachment portion extending substantially orthogonal from the first light pipe and the second attachment portion extending substantially orthogonal from the second light pipe, wherein a path defined between the first and second light pipes through the connector conducts substantially no light due to a plurality of bends therein.

2. The device of claim 1 wherein the first and second light pipes and the connector are fabricated as an integral unit.

3. The device of claim 1 wherein the first and second attachment portions attach to the first and second light pipes at a first point and a second point, respectively, the elongated portion being substantially parallel to a line defined between the first and second points.

4. The device of claim 1 wherein the first and second light pipes are in parallel alignment.

5. The device of claim 1 wherein the device is fabricated from a clear plastic material.

6. A device for conducting light through an electromagnetic compliant faceplate comprising:

a first light pipe having a first end to receive light from a first light source and a second end with an expanded endface;

a second light pipe having a first end to receive light from a second light source and a second end with an expanded endface; and a connector attached to the first and second light pipes and having at least one tab, an elongated portion, a first attachment portion and a second attachment portion, the first and second attachment portions extending substantially orthogonal from the elongated portion, the first attachment portion extending substantially orthogonal from the first light pipe and the second attachment portion extending substantially orthogonal from the second light pipe, wherein a path defined between the first and second light pipes through the connector conducts substantially no light due to a plurality of bends therein.

7. The device of claim 6 wherein the first and second light pipes and the connector are fabricated as an integral unit.

8. The device of claim 6 further comprising the faceplate, each of the first and second light pipes extends through a respective opening in the faceplate.

9. The device of claim 6 further comprising the first and second light sources.

10. The device of claim 9 wherein the first and second light sources are light emitting diodes.

11. The device of claim 6 wherein the tab of the connector comprises a resilient stem having a first end attached to the connector and a second end to be received by a channel in the electromagnetic compliant faceplate.

12. The device of claim 6 wherein the device is fabricated from a clear plastic material.

* * * * *